T. H. HUNTER.
ADVERTISING FILM AND METHOD OF PRODUCING THE SAME.
APPLICATION FILED NOV. 6, 1919.
1,426,567.
Patented Aug. 22, 1922.
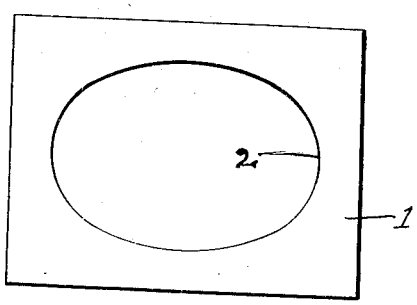
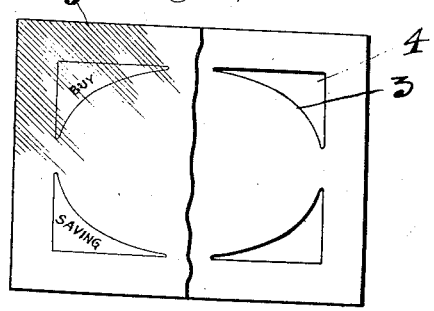
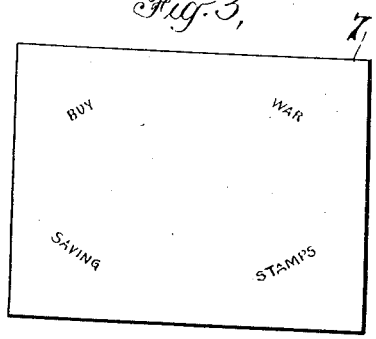
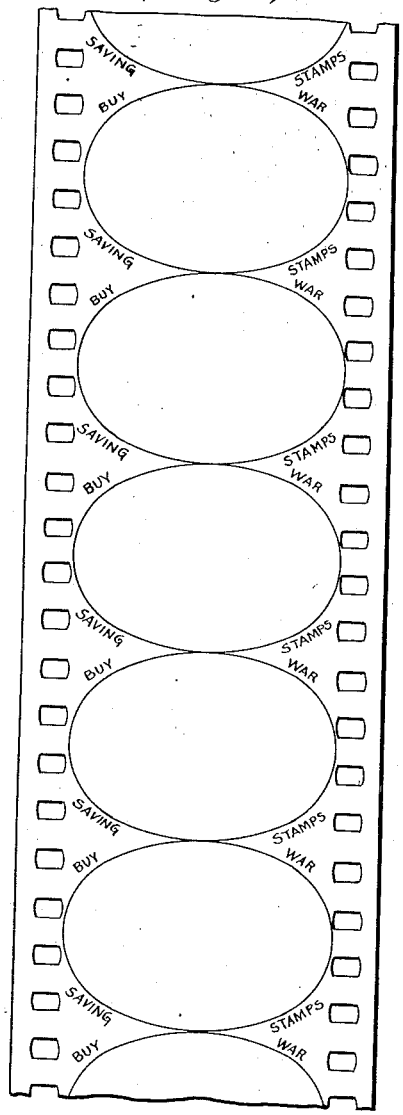
Inventor
T. Hayes Hunter
By his Attorneys
Pennie, Davis, Marvin & Edmonds

UNITED STATES PATENT OFFICE.

THOMAS HAYES HUNTER, OF LOS ANGELES, CALIFORNIA.

ADVERTISING FILM AND METHOD OF PRODUCING THE SAME.

1,426,567.  Specification of Letters Patent.  Patented Aug. 22, 1922.

Application filed November 6, 1919. Serial No. 336,206.

*To all whom it may concern:*

Be it known that I, THOMAS HAYES HUNTER, a citizen of the United States, residing at No. 2505 Tenth Ave., Los Angeles, in the county of Los Angeles, State of California, have invented certain new and useful Improvements in Advertising Films and Methods of Producing the Same; and I do hereby declare the following to be a full, clear, and exact description of the invention, such as will enable others skilled in the art to which it appertains to make and use the same.

This invention relates to moving picture films and method of making the same, and has for its object the production of a film for producing advertising matter on the screen in connection with the usual photo play or other subject of the film, in such manner as to make the advertising matter impressive without in any way detracting from the photo play or lessening the interest of the spectators therein.

A further object of the invention is to produce an advertising film which may be made from the usual standard negative film without any change therein, whereby reprints containing advertising matter may be made from negative films already in existence.

Advertising by means of motion pictures has heretofore been attempted usually by "picturizing" the manufacture or use of the article to be advertised, or producing a picture story in which the use or manufacture of the article is a part, or in which the thing advertised is drawn into and made a part of the story. Such efforts at advertising have not, however, proved generally successful, for the reason, on the one hand, that there is seldom anything of sufficient novelty or interest in the production of the goods to be advertised to sustain an interest in the picture, and on the other hand, if the thing advertised is drawn into the plot of a photo play and emphasized sufficiently to have advertising value, the thread of the story is broken or the interest of the spectators is lessened.

According to my invention I simultaneously display the advertising matter on the screen with the photo drama, but entirely unconnected with it in subject-matter, the advertising matter being preferably a still picture or scene in the border or corner of the motion picture, which will persist unchanged in the vision of the spectators for a sufficient time to be impressed subconsciously without breaking into the thread of the drama or in any way detracting therefrom.

In carrying out my invention I preferably employ apparatus shown in the accompanying drawings, although of course other apparatus may be used if desired. My improved film is also shown in the drawings.

In the said drawings,

Figure 1 is a plan view of a mask employed in printing the raw positive film from an ordinary negative.

Fig. 2 is a plan view of a second mask employed in making a second printing of the positive film;

Fig. 3 is a similar view of a modified form of mask which may be used for the second printing; and Fig. 4 is an enlarged view of a section of the film produced by my improved method.

In carrying out my invention I take an ordinary negative film which, as well known, has its entire length filled with the successive pictures of the play in action divided one from the other by narrow unexposed lines, and upon this film I print in the usual manner a positive picture of the drama in the ordinary printing machine, except that at the printing aperture I insert a mask, such, for example, as shown in Fig. 1, and comprising an opaque plate 1 with a middle opening 2 of a design such that there will be left on the positive, unexposed areas of film at the margins of the picture of sufficient size to contain the advertising matter without covering any portion of the film necessary to show the action of the story. An oval opening, such as shown in Fig. 1, may be used with the great majority of negatives without taking away anything essential from the positive picture, for the reason that the action of the drama is kept near the center of the film and there is seldom anything in the corners of the negative pictures which is required to be shown in the positive or which adds anything of interest to the picture.

After the positive film is printed from the negative the mask and negative are removed from the printing machine and a second mask, such as shown in Fig. 2, inserted, this mask comprising an oval opaque plate 3 of the same dimensions as the opening of plate 1 and held in place at its two diameters so as to leave the openings 4 at the corners in the manner shown. Back of the mask there will be placed a negative slide 5 having in the corners over the openings 4 the advertising legends or pictures which it is desired to print in the corners of the film. The previously exposed positive film will then be run through the printing machine without the negative film, care being taken to thread the film in the machine so that the previously exposed picture area will come under the opaque oval in the mask.

When the film so printed is developed it will have the appearance of the film shown in Fig. 5, that is, there will be the usual succession of pictures making up the action of the play in the exposed ovals and in one or more of the corners there will be an advertising display entirely unrelated with the subject-matter of the film which, when the picture is projected, will necessarily lie within the field of vision of the spectators.

The advertising subject-matter is preferably a still picture and is continued unchanged throughout the length of the film or a substantial portion of it, so as to be impressed subconsciously upon the spectators without detracting their interest from the picture. The introductory portion of moving pictures as produced today is usually composed chiefly of titles, notices, introductions of characters, etc., which occupy an appreciable length of the film—and require appreciable time to display before the actual story begins. If the advertising matter is placed on the film at the beginning so that it will first be seen and read by the spectators during the introductory portion of the story, its presence will have become so familiar by the time the actual story is reached that it will no longer be consciously noticed, and yet the spectators will carry away a much more lasting impression of the advertisement by reason of its long continuance than they would if the showing of the advertisement were confined to the preamble to the picture or merely shown briefly by slides while the film is being changed, as is sometimes done today.

There will preferably be only one advertised subject to the film subject, but of course the advertisement may be changed at intervals in the length of the picture if desired.

Instead of having the advertising matter on a separate plate as indicated in Fig. 2, the mask for the second printing may consist of a plate 7 completely covering the printing aperture, as indicated in Fig. 3, with the advertising matter cut in the margin of the plate corresponding with the opaque portion of the mask used for the first printing. I preferably, however, in all cases, divide the printing into two steps, so that the advertising matter will be printed on unexposed film and entirely detached from the picture.

It is possible to have but one step in the printing by printing through the negative and also through a mask having the opening for the picture as in Fig. 1, but with the surrounding portions containing the advertising matter in stencil or otherwise. The light at this portion would of course pass through the negative film also, and would not be uniform throughout, but with the exposed portions (particularly if the sign is composed entirely of letters) surrounded by the completely unexposed film a sufficient contrast is produced for the uneven exposure of the letters not to be unpleasantly noticeable.

As stated above, I prefer to have the advertising matter in the form of a still picture or legend, but the advertising matter may show motion also, if desired, in which event, instead of printing a second exposure through a stencil or negative slide, a second film will be employed having the necessary succession of pictures in the corners corresponding to the unexposed portion of the negative, to produce the desired advertising matter.

I claim:

The method of producing motion picture film which consists in printing a positive film from the usual negative film having its successive picture-bearing portions commensurate in area with the projection aperture of the projecting machine by which the positive is to be projected, said printing being effected through a mask having opaque portions obscuring the light from portions of the positive film which are in printing relation with the uniformly disposed successive portions of the picture-bearing sections of the negative film, and photographically printing on the positive film within the unexposed areas a succession of uniformly disposed advertising legends of a subject-matter entirely irrelevant to the subject of the pictures.

In testimony whereof I affix my signature.

THOMAS HAYES HUNTER.